United States Patent [19]
Woodgate et al.

[11] Patent Number: 5,833,507
[45] Date of Patent: Nov. 10, 1998

[54] METHOD OF MAKING AN SLM, SLM, AUTOSTEREOSCOPIC DISPLAY, AND BACKLIGHT

[75] Inventors: Graham John Woodgate, Oxfordshire; Jonathan Harrold, Oxford; David Ezra, Wallingford, all of United Kingdom

[73] Assignee: Sharp Kabushiki Kaisha, Osaka, Japan

[21] Appl. No.: 675,584

[22] Filed: Jul. 3, 1996

[30] Foreign Application Priority Data

Jul. 4, 1995 [GB] United Kingdom .................... 9513634

[51] Int. Cl.⁶ .................................................. H04N 13/04
[52] U.S. Cl. ............................... 445/24; 349/106; 349/110
[58] Field of Search ............................... 445/24; 349/106, 349/109, 110

[56] References Cited

U.S. PATENT DOCUMENTS 5,235,447  8/1993  Hepp et al. ............................... 349/109

FOREIGN PATENT DOCUMENTS

| | | |
|---|---|---|
| 0316465 | 4/1989 | European Pat. Off. . |
| 0625861 | 11/1994 | European Pat. Off. . |
| 6043635 | of 1985 | Japan . |
| 2278223 | 11/1994 | United Kingdom . |

OTHER PUBLICATIONS

Search Report for Application No. 96304959.8–2205–; Dated Nov. 24, 1997. (EPO).
Search Report for UK Appl. 9513634.7, Mailed Sep. 14, 1995.

O'Mara, "Active Matrix Liquid Crystal Displays Part:I Manufacturing Process"; Solid State Technology; The Flat Panel Display Series, 1994, pp. 1–7.

US Application of Woodgate et al, Serial No. 08/579,666, Filed Dec. 27, 1995.

US Application of Woodgate et al, Serial No. 08/592,563, Filed Jan. 26, 1996.

US Application of Egra et al. Serial No. 08/546,510, Filed Oct. 20, 1995.

US Application of Woodgate et al, Serial No. 08/573,155, Filed Dec. 15, 1995.

US Application of Ezra et al, Serial No. 08/167,497, Filed Dec. 15, 1993.

US Application of Ezra et al, Serial No. 08/245,584, Filed May 18, 1994.

Primary Examiner—Kenneth J. Ramsey

[57] ABSTRACT

In order to provide an active matrix liquid crystal spatial light modulator suitable for use in autostereoscopic displays, the conventional delta arrangement of liquid crystal pixels is formed. However, instead of forming the conventional black mask, a new type of black mask is provided. This black mask defines groups of two or more columns of pixel openings such that the columns of each group are substantially contiguous.

16 Claims, 14 Drawing Sheets

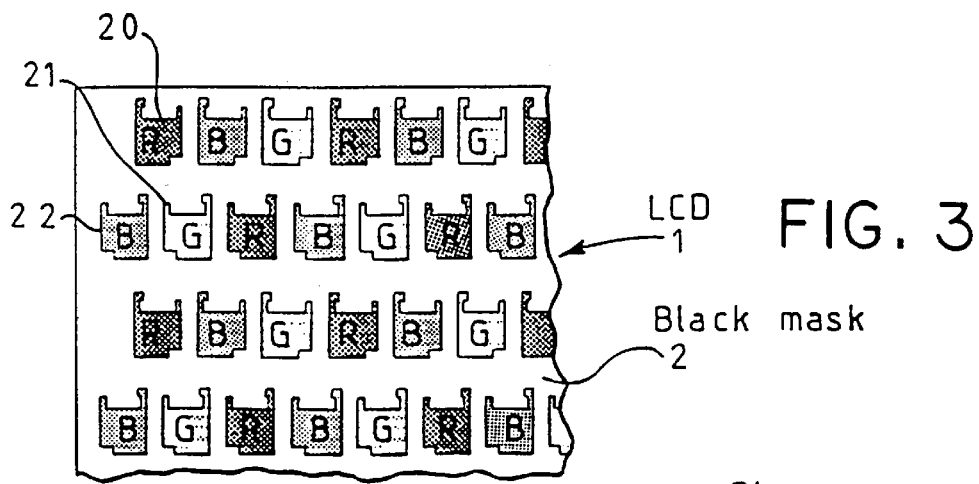
FIG. 3
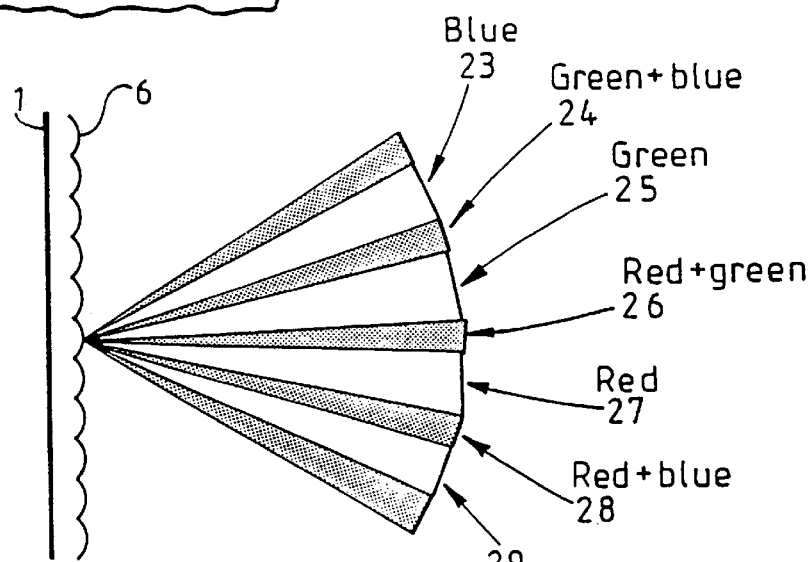
FIG. 4
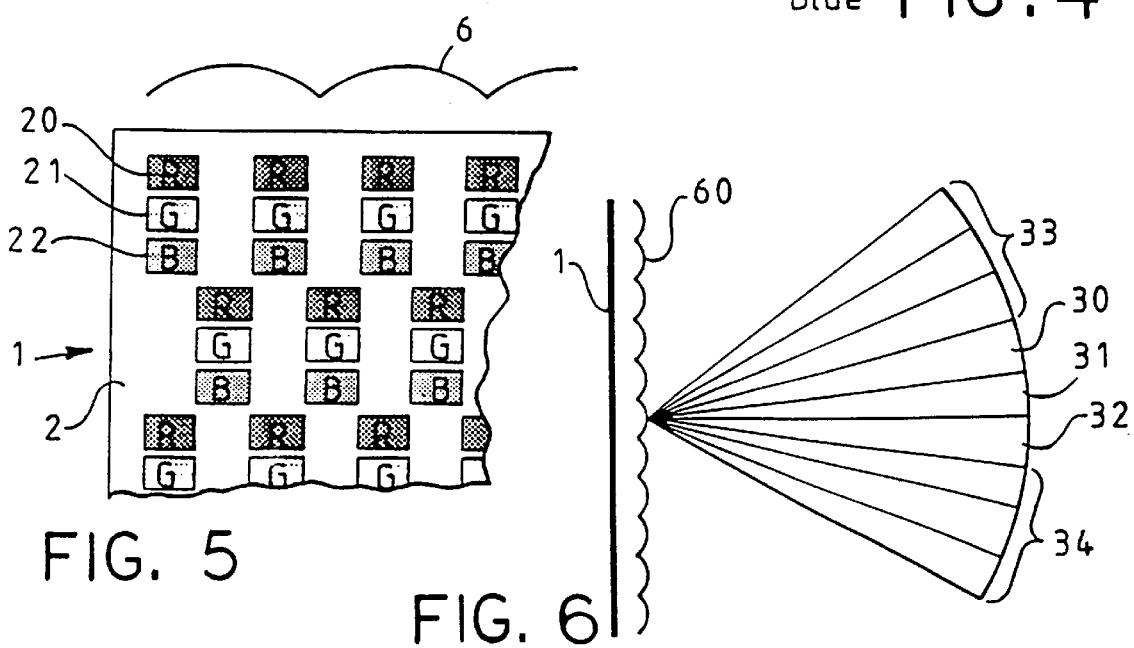
FIG. 5
FIG. 6

Masked pixels do not overlap horizontally. Right (R), Left (L) and Black (B) horizontal widths are substantially equal for effective prevention of pseudoscopic zone visibility. Display pixel sequence shown.

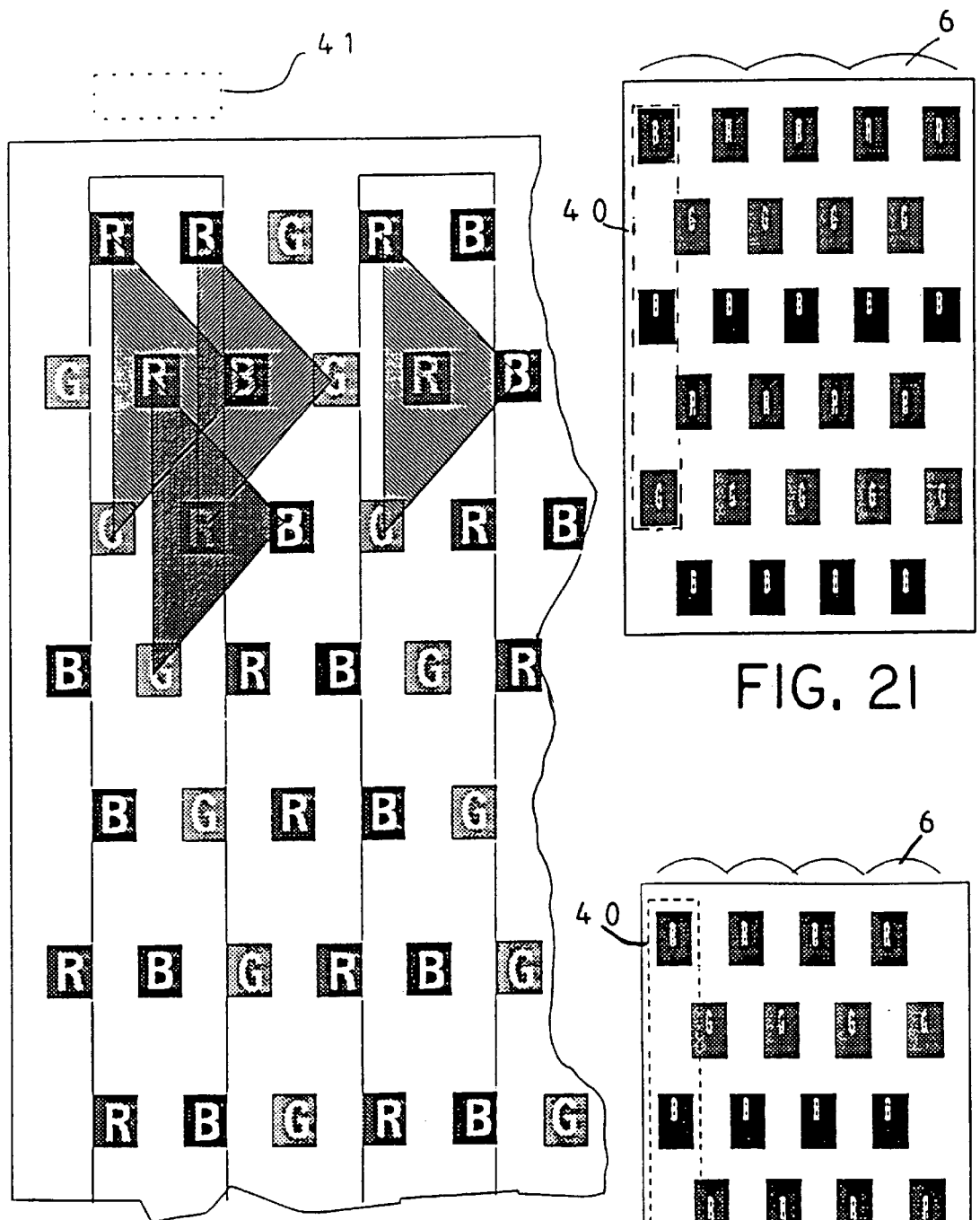
FIG. 20
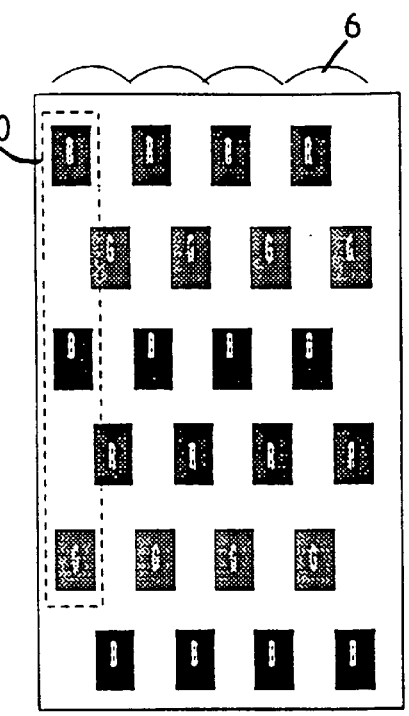
FIG. 21
FIG. 22

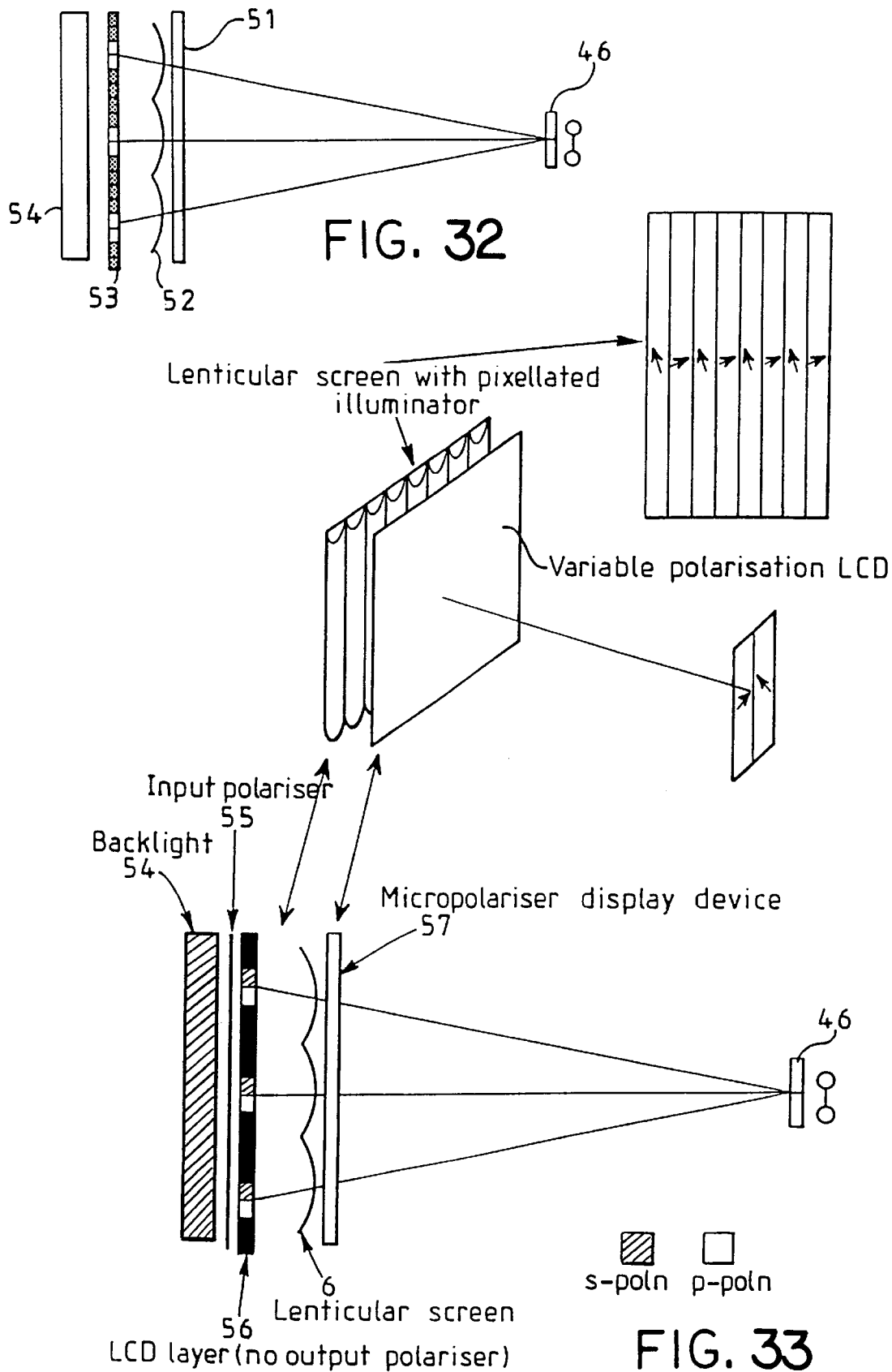

METHOD OF MAKING AN SLM, SLM, AUTOSTEREOSCOPIC DISPLAY, AND BACKLIGHT

The present invention relates to a method of making a liquid crystal spatial light modulator and to a liquid crystal spatial light modulator made by such a method. The present invention also relates to an autostereoscopic display and a backlight including such a spatial light modulator.

So-called "delta pattern" liquid crystal display (LCD) panels are manufactured in large numbers and are commonly used in audio visual applications for displaying television and/or video signals. Such delta panels provide a simple method of handling interlaced standard-video signals with fewer picture elements (pixels) than would be needed for comparable image quality in a display panel of the "stripe pattern" type; this can be as few as one half. Stripe pattern panels are generally used in office automation equipment such as computer or multi-media displays. In order for liquid crystal displays to be useful in battery powered equipment, there is a requirement to reduce the power consumption of such displays. As is known, one way of achieving this is by maximising the clear aperture of the pixels and, in order to make maximum use of the panel area, the pixels in adjacent rows of a delta panel are arranged to overlap each other as much as possible.

In active matrix displays which use a switching device, such as a thin film transistor or diode, at each pixel, the apertures through which the liquid crystal pixels are visible i.e. light transmitting or reflecting, are defined by an opaque mask which hides regions of the panel around the pixels and parts of the pixels where undesirable visual artifacts may occur, for instance caused by fringing fields created between and at the edges of addressing electrodes of the pixels. The opaque mask is normally referred to as a "black mask" or "black matrix". In addition to defining the visible parts of the pixels, the black mask covers the regions between the pixels and is desired to be as non-reflective as possible so as to increase the contrast ratio of the panel. This is desirable because regions containing, for example, electrodes and thin film transistors tend to be reflective and so would reduce the contrast ratio of the panel when used in levels of background illumination such as those which occur in an office. Additionally, in autostereoscopic three dimensional (3D) displays, reflection from such regions would cause an increase in stray light in the display. This would result in an increase in the levels of cross-talk in the display so that the left eye of an observer would see some light from the right eye image and vice versa. This could result in headaches to the observer and visible image degradation.

A typical LCD panel of the active matrix type comprises two substrates with the liquid crystal located therebetween. One of the substrates carries the active matrix addressing electronics, for instance in the form of thin film transistor addressing circuitry and associated electrodes. The other substrate carries one or more further addressing electrodes and at least part of the black mask. The black mask may be formed as several layers on both substrates, but it is common to form the black mask on the substrate opposite the active matrix and as a single layer.

JP-60-43635 discloses a passive matrix LCD comprising two rows of pixels. The pixels are defined by the overlapping regions of column electrodes formed on a first substrate and row electrodes formed on a second substrate. A black mask defines pixel openings which limit the pixel apertures so as to avoid undesirable visual artifacts, for instance caused by fringing fields. Although not wholly clear from the disclosure of JP-60-13635, it appears that each pixel opening may be contiguous, in the row direction, with the or each adjacent pixel opening in the adjacent row.

GB 2 278 223 and EP 0 625 861 disclose a liquid crystal spatial light modulator comprising rows and columns of pixels. The pixel columns are arranged as groups such that adjacent columns of each group are horizontally contiguous. A parallax device such as a lenticular screen is arranged with each element over a respective group of columns. Such an arrangement, when provided with suitable illumination, may be used as an autostereoscopic display with continuous and substantially uniform illumination profile over a wide range of angles.

FIG. 1 of the accompanying drawings shows a known type of LCD 1 comprising rows and columns of pixels defined by apertures in a black mask 2. The panel is shown rotated by 90° from its conventional orientation so as to be suitable for use as an autostereoscopic display. The black mask 2 is opaque and covers non-active areas, such as drive electronics and electrodes, which are reflective and would otherwise reduce the contrast ratio of the panel and cause cross-talk from stray light in autostereoscopic 3D displays. The black mask 2 also covers areas of the liquid crystal where undesirable visible artifacts, for instance caused by fringing fields, may occur. The black mask 2 is desired to be of very low reflectivity so as to increase the contrast ratio of the display. The visible pixel areas are provided with red, green, and blue filters so as to define red pixels (R) 3, green pixels (G) 4, and blue pixels (B) 5. The RGB pixels are arranged in a repeating pattern of rows so that each column comprises R, B, and G pixels.

The LCD 1 is associated with a lenticular screen 6 which comprises parallel columns of cylindrically converging lenses or lenticules. Each lenticule is aligned with two columns of pixels so as to form, with a suitable illumination system, a two view autostereoscopic three dimensional display.

FIG. 2 illustrates the distribution of light from the display illustrated in FIG. 1. In particular, FIG. 2 represents diagrammatically a view from above and illustrates light "lobes" emanating from one of the lenticules of the screen 6. The columns of the LCD 1 display alternate stripes of the two views in a spatially multiplexed fashion. For instance; the column 7 displays a strip of a left eye view whereas the column 8 displays a strip of a right eye view. Light from the columns is imaged as shown in FIG. 2 by the aligned lenticule so that the right eye view strip is visible in the window 9 and the left eye view strip is visible in the window 10. Thus, when the left and right eyes of an observer are positioned appropriately, a three dimensional image can be seen.

A problem with the display shown in FIG. 1 is that the columns such as 7 and 8 are separated by opaque regions of the black mask 2. This gives rise to dark regions such as 11 where no light is emitted. Further, because of the shape of the pixels, there are regions such as 12 and 13 of low light. Also, in addition to the windows 9 and 10, the columns are imaged into lobes 14 and 15. Thus, if the left and right eyes of an observer were positioned such as to receive light from the lobes 15 and 10, respectively, the left and right views would be reversed, leading to pseudoscopic viewing of the images. Accordingly, LCD's 1 of the type shown in FIG. 1 are not ideal for use in autostereoscopic displays.

FIGS. 3 and 4 correspond to FIGS 1 and 2, respectively, but show another known type of display having a delta arrangement of RGB pixels. The LCD 1 of FIG. 3 differs from that of FIG. 1 in that the RCB pixels are arranged in the delta configuration i.e. at the apices of a triangle. For instance, the pixels 20, 21 and 22 display the red, green, and blue components of one colour picture element of the display. The pixels of each row overlap in the horizontal direction of FIG. 3 with the two adjacent pixels in each adjacent row.

The use of a LCD 1 of the type shown in FIG. 3 gives rise to the problems illustrated in FIG. 4. Colour separation occurs because of the way in which the lenticular screen 6 images the RGB pixels. Thus, in region 23, only the blue pixels are visible. In region 24, portions of the green and blue pixels are visible, giving rise to inappropriate colour mixing. In region 25, only the green pixels are visible. Similarly, in the regions 26, 27, 28, and 29, the red and green pixels, the red pixels, the red and blue pixels, and the blue pixels, respectively, are visible. Thus, LCD's of the type shown in FIG. 3 are inappropriate for autostereoscopic displays.

FIG. 5 illustrates a LCD 1 of the type disclosed in EP 0 625 861. In this LCD, each set of R, G, and B pixels 20, 21, and 22 forming a colour picture element are arranged vertically above each other and the colour pixels are arranged in columns with the columns under each lenticule of the screen 6 being contiguous i.e. there are no continuous vertical portions of the black mask 2 between adjacent columns. In the arrangement shown in FIG. 5, there are three columns of pixels aligned with each lenticule of the screen 6.

This arrangement gives rise to the light distribution illustrated in FIG. 6. The columns of pixels are imaged into three windows 30, 31, and 32 which are contiguous so that there are no gaps or regions of reduced brightness, overlap or increased brightness between the windows. The columns are also imaged into plus and minus first order lobes 33 and 34, which may be useful in some types of displays. The lobes are arranged such that there is substantially no reduced or increased light region between adjacent lobes.

Although the pixel arrangement shown in FIG. 5 overcomes the problems of the pixel arrangements shown in FIGS. 1 and 3, the LCD 1 of FIG. 5 has to be manufactured specially in order to provide the pixel arrangement shown. In particular, a new electronic driving scheme is required and new mask patterns for the active elements and internal electrodes of the LCD are required. This makes LCD's of the type shown in FIG. 5 relatively expensive, particularly for low volume production.

According to a first aspect of the invention, there is provided a method of making an active matrix liquid crystal spatial light modulator, comprising:

forming on a first substrate an array of addressing electrodes defining an array of liquid crystal pixels in which at least some of the pixels overlap in a predetermined direction; and forming on at least one of the first substrate and a second substrate an opaque mask defining pixel opening which are arranged to be optically aligned with respective ones of the pixels and which are arranged as groups of N adjacent columns of pixel openings, where N is an integer greater than 1, such that the columns extend substantially perpendicularly to the predetermined direction and such that the columns of each group are substantially contiguous.

Preferably the array of pixels is a delta arrangement.

Preferably there is formed a filter comprising colour stripes extending substantially perpendicularly to the columns. In one embodiment, each colour stripe is aligned with a row of pixels. In another embodiment, each colour stripe is aligned with two adjacent rows of pixels.

In an alternative, there is formed a filter comprising colour stripes extending diagonally with respect to the columns, each colour stripe being aligned with a line of pixels.

The filter may comprise repeating sets of red, green and blue colour stripes.

Preferably, the pixel openings are of substantially constant and equal height in all axes substantially perpendicular to the predetermined direction.

According to a second aspect of the invention, there is provided a liquid crystal spatial light modulator made by a method according to the first aspect of the invention.

According to a third aspect of the invention, them is provided an autostereoscopic display comprising a spatial lght modulator according to the second aspect of the invention and a parallax screen.

In one embodiment, the parallax screen comprises a lenticular screen, each of whose lenticules is aligned with a respective group of columns.

In another embodiment, the parallax screen comprises a parallax barrier, each of whose slits is aligned with a respective group of columns.

The spatial light modulator may have a plurality of colour inputs connected to a processing circuit for supplying each of the colour inputs with image data of a respective view.

According to a fourth aspect of the invention, there is provided a backlight for an autostereoscopic display, comprising a spatial light modulator in accordance with the second aspect of the invention and an extended light source.

According to a fifth aspect of the invention, there is provided an autostereoscopic display comprising a backlight according to the fourth aspect of the invention.

It is thus possible to make a liquid crystal (LC) spatial light modulator (SLM) which is particularly suitable for use in autostereoscopic displays and which involves only relatively small changes in conventional techniques for making known active matrix LCSLM's such as liquid crystal displays (LCD's). In particular, only the steps involved in forming the opaque or "black" mask and, where necessary, the colour filter may be modified. The cost of design and manufacture is thus relatively low.

For instance, it is possible to modify the manufacture of delta panels at low additional cost so as to provide liquid crystal spatial light modulators suitable for use in 3D displays. Delta panels are manufactured in very large numbers and are therefore relatively inexpensive. For such panels in which the black mask is formed as a single layer, it is merely necessary to modify one of the manufacturing steps by changing the lithography defining the black mask. Thus, for panels in which the black mask is formed on the substrate opposite that carrying the active matrix, the active matrix substrate does not require any modification.

The form of black mask required differs from that of conventional displays in that light throughput is sacrificed in order to provide a panel which is suitable for 3D displays. This is contrary to the conventional approach for designing black masks so as to maximise light throughput. However, by modifying the manufacture of conventional panels in this way, it is possible to provide a panel which is suitable for 3D displays and which is far less expensive to manufacture than would be the case for a specially designed panel, for instance requiring redesign of all the lithography required to produce the active matrix.

It is also possible to provide a purpose built autostereoscopic 3D SLM. In this case, the precise tolerances required are only provided in the black mask layer. The pixels are designed to overlap slightly on the active matrix substrate with a reduced tolerance. Such SLMs are particularly suitable for use in autostereoscopic displays and can provide the ability to track a moving observer with no moving parts such that the intensity of the image seen on the display does not flicker as the observer moves. A 3D image can be provided with enhanced viewing freedom in a non-tracked display and the amount of visible cross-talk can be controlled by particular pixel arrangements. In displays with moving parts, the amount of image flicker for a moving observer is reduced. Lateral and longitudinal viewing freedom is maximised. Brightness uniformity of such a display is improved and this reduces the possibility of brightness differences between left and right images, which differences could result in depth distortions, for instance by the Pulfrich effect. Alignment tolerances during assembly are reduced so that the display is more robust.

The invention will be further described, by way of example, with reference to the accompanying drawings, in which:

FIG. 3 shows the pixel arrangement of another known type of LCD;

FIG. 4 shows the distribution of light from a 3D display using the LCD of FIG. 3;

FIG. 5 shows an autostereoscopic display of the type disclosed in EP 0 625 861;

FIG. 6 shows the distribution of light from the display of FIG. 5;

FIGS. 19 to 25 illustrate colour filter arrangements;

FIGS. 31 to 33 illustrate autostereoscopic displays with backlights using LCSLM's having black masks of the type shown in FIG. 10 or 17.

Figure 1:
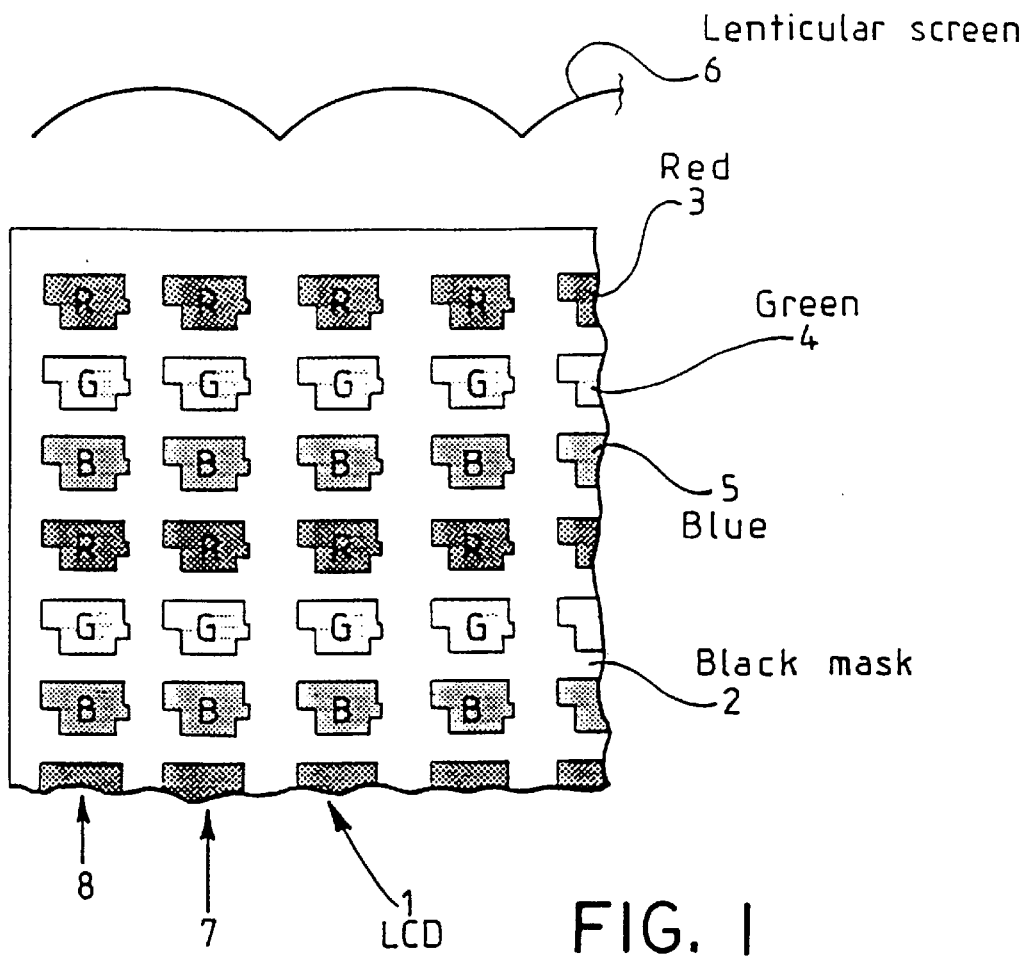
FIG. 1 illustrates the use of a known type of LCD in an autostereoscopic display.
Figure 2:
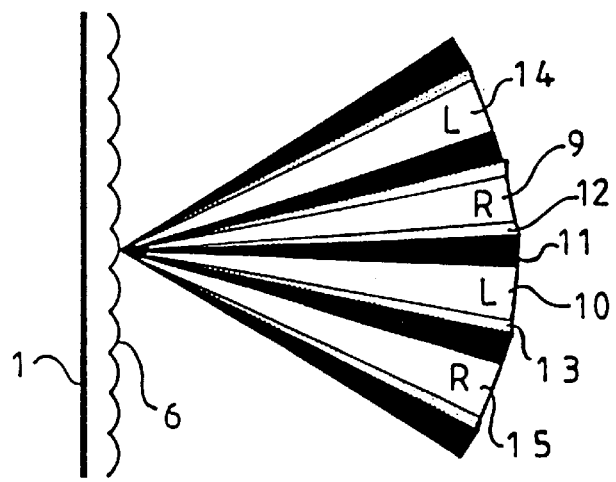
FIG. 2 shows the distribution of light from the display illustrated in FIG. 1.

The term "delta arrangement" as used herein means arranged at the apices of a triangle and is a term in common use to describe such LCD pixel arrangements.

Like reference numerals refer to like parts in the drawings.

Figure 7:
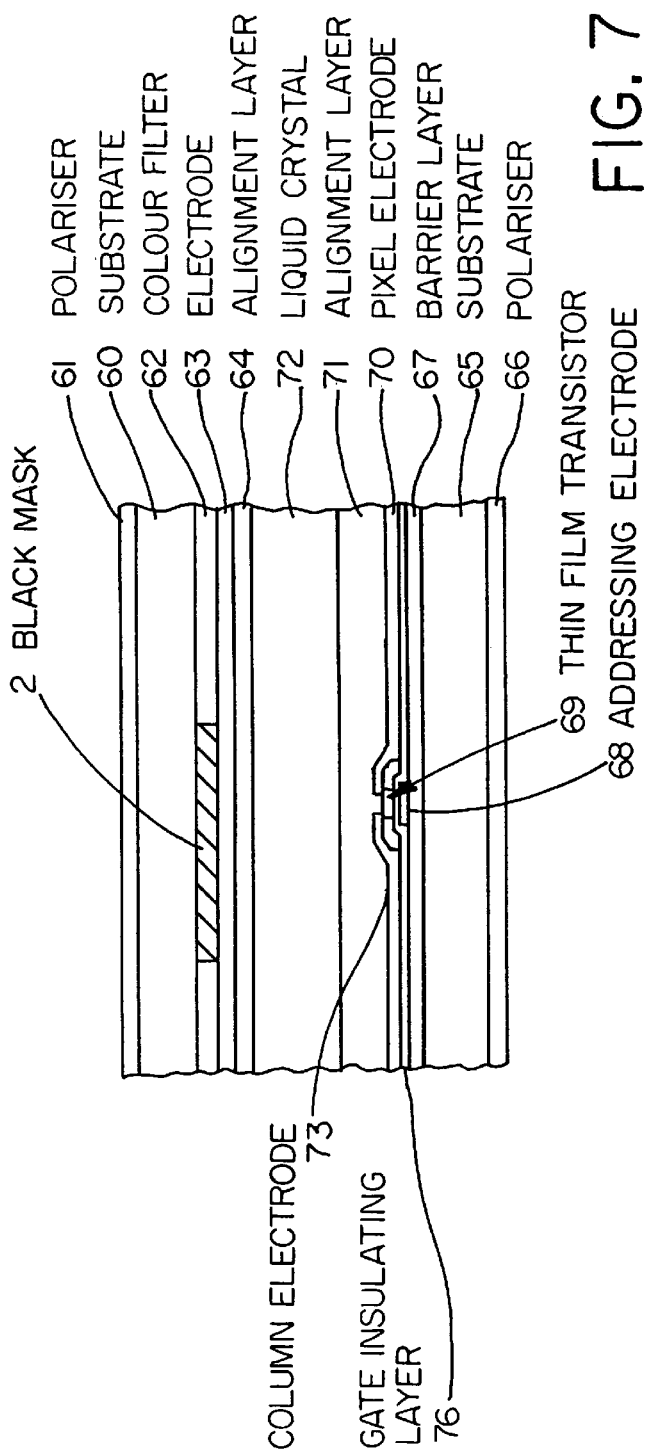
FIGS. 7 and 8 are cross-sectional views of parts of known active matrix LCD delta panels.

FIG. 7 illustrates a simplified structure of a typical active matrix LCD delta panel comprising a substrate 60 of glass carrying a polariser 61 on its outer surface. The inner surface of the substrate 60 has formed thereon a layer comprising a colour filter and the black mask 2. A transparent continuous electrode 63, for instance of indium tin oxide (ITO), is formed on that layer and carries an alignment layer 64, for instance of rubbed polyimide.

A substrate 65 carries on its outer surface a polariser 66 and has formed on its inner surface a sodium barrier layer 67, such as silicon dioxide, and a gate insulating layer 76. The barrier layer 67 carries addressing components illustrated in FIG. 7 by an addressing electrode 68 and a thin film transistor 69. Pixel electrodes 70 define the active pixel areas of the display. An alignment layer 71 is formed on the layer containing the electrodes 70 and liquid crystal 72 is provided between the alignment layers. A column electrode is shown at 73.

During manufacture of the delta panel, the layers 62, 63 and 64 are formed on the substrate 60 with the colour filters 62 and the black mask 2 being defined, for instance, by photolithography or similar processes. Similarly, the layers 67, 70 and 71 together with the components 68 and 69 are formed on the substrate 65. The electrodes 70 and the other components including the electrode 68 and the thin film transistor 69 are formed in a plurality of steps involving the use of photo-masking using several different masks so as to form the desired structure. When the substrates 60 and 65 and associated layers have been formed, the panel is completed by assembling these components with spacers between the alignment layers 64 and 71 and filling the space therebetween with the liquid crystal 72. Accurate alignment is necessary to ensure that the black mask 2 covers the appropriate regions such as the components 68 and 69 and the edges of the electrodes 70 to avoid undesirable visual artifacts. It is also possible to fabricate the "counter" substrate 60 with the electrode 63 between the glass substrate and colour filter layers.

Figure 8:
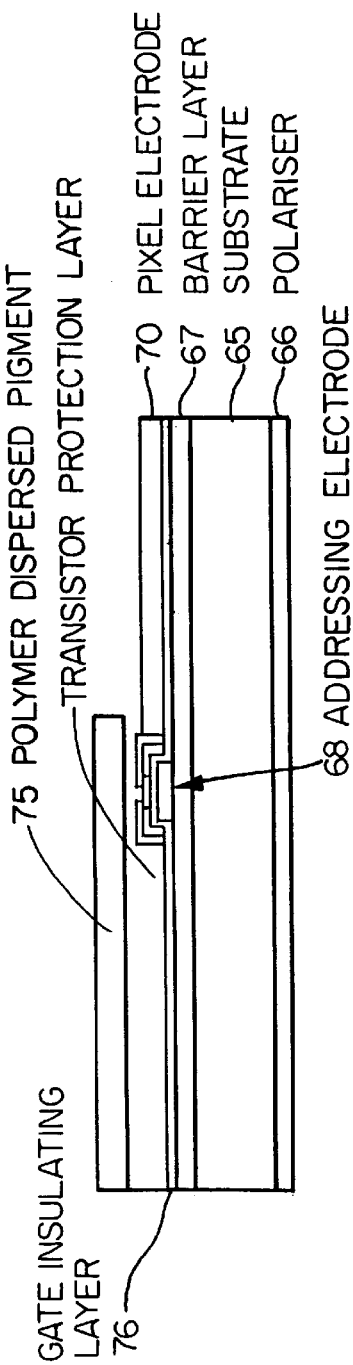

Although the black mask 2 is shown as being disposed in a single layer of the panel, it may be provided in several layers and may be carried wholly or in part by the substrate 65. In this case, it is known as the "BM on array" technique. Light from regions of the LCD which do not switch correctly is shielded by a combination of opaque metal addressing electrodes and by, for example, a layer of pigment dispersed polymer 75 as shown in FIG. 8. The effect of the black matrix can also be provided by components on the substrate 65 and on the counter substrate 60.

Figure 9:
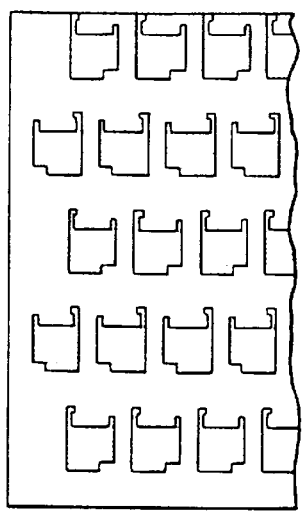
FIG. 9 illustrates a conventional delta pattern and black mask.

FIG. 9 illustrates one form of conventional delta pattern black mask which defines the regions of the active pixels which are visible. When this black mask is used in the structure shown in FIG. 7, a conventional delta panel is provided.

Figure 10:
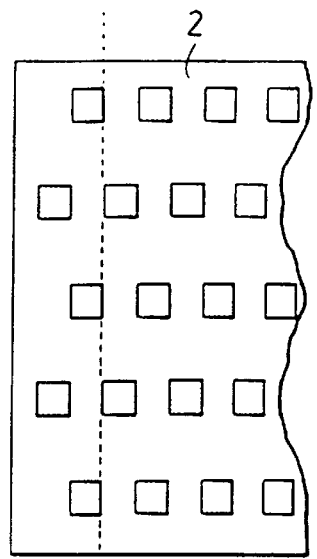
FIG. 10 illustrates a modified black mask pattern for making a LCSLM in accordance with a method constituting a first embodiment of the invention.

FIG. 10 illustrates a modified pattern black mask 2 which may be used in place of the pattern of FIG. 9 to modify an LCD of the type shown in FIG. 7 so as to provide an embodiment of the present invention which is suitable for use in autostereoscopic displays. The mask 2 is modified in that the apertures for the active pixels are arranged in columns which do not substantially overlap horizontally but which are substantially contiguous horizontally i.e. there is minimal or no continuous vertical strip of the black mask 2 between adjacent columns. In particular, if in the actual fabrication of the black mask the corners of the apertures were to be slightly rounded, the apertures in the black mask can be slightly overlapped to compensate for the intensity dip resulting from the corners.

By using the black mask 2 of FIG. 10 in place of the mask of FIG. 9, an LCD can be made which is otherwise conventional but which is suitable for use in autostereoscopic displays. In particular, it is unnecessary to change the positioning of the addressing electrodes 68 or the active matrix elements, such as the transistors 69, in the display. Further, it is not necessary to move the transistors 69 and other electronic components forming part of an electronic drive scheme of the display. It is accordingly not necessary to provide a completely new mask-set for an active matrix type display. Instead it is merely necessary to redesign the production masks for the black mask 2. Where necessary, the colour filters 62 are modified.

Figure 11:
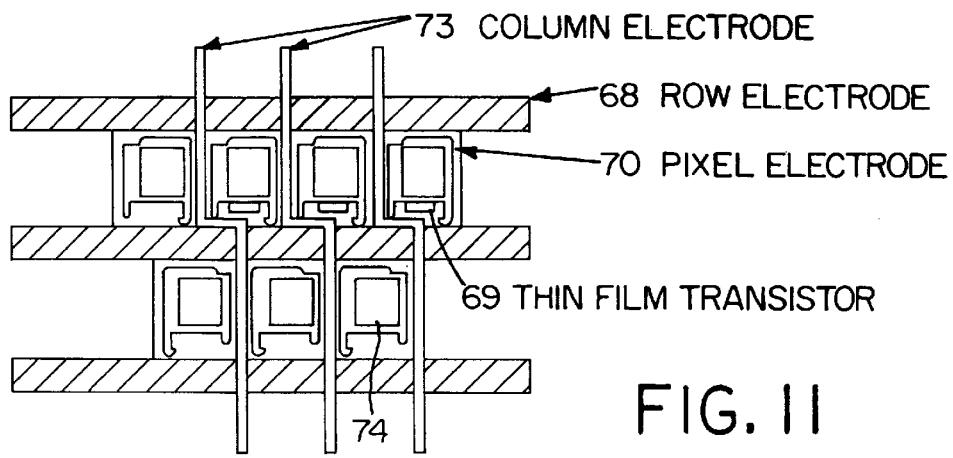
FIG. 11 is a plan view of part of an LCD of the type shown in FIG. 7 but using the modified black mask pattern of FIG. 10.

FIG. 11 illustrates the structure of an active matrix LCD delta panel modified by use of the black mask illustrated in FIG. 10. The "active matrix" substrate 65 carries the column electrodes 73, row electrodes 68 and the thin film transistors 69 together with the "pixel" electrodes 70 which define the active pixel regions. The regions such as 74 illustrate the locations of the pixel apertures formed in the black mask 2 which, in the embodiment shown, is disposed on the counter substrate 60. The pixel apertures thus define the actual display pixel regions which are arranged in horizontally contiguous columns. Further, the pixel apertures 74 are of constant height and typically rectangular. The height of the pixels is maximised so as to maximise display brightness.

Figure 12:
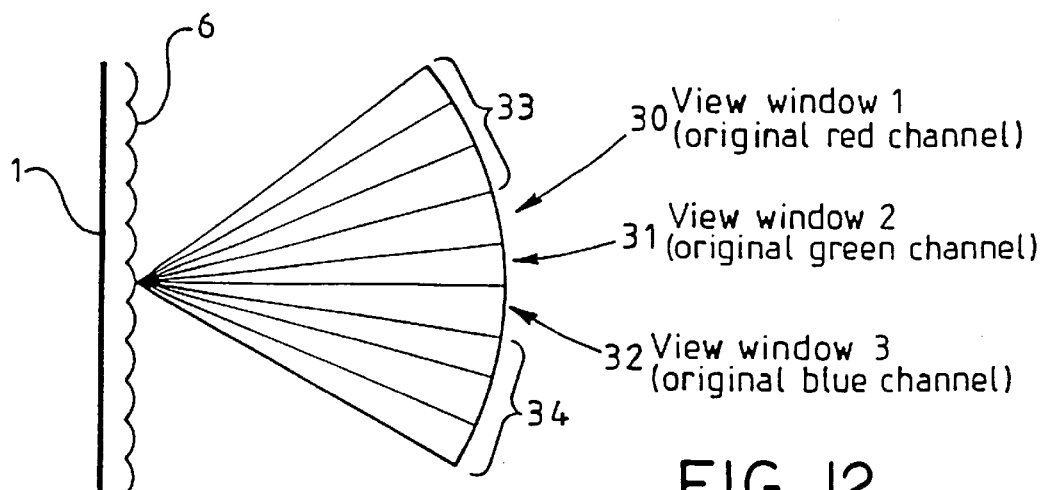
FIG. 12 shows the distribution of light from an autostereoscopic display with a LCSLM using the pattern of FIG. 10.

By omitting the colour filters 62 of a conventional display, an LCD using the modified black mask 2 of FIG. 10 can provide a monochrome LCD which is suitable for use in autostereoscopic displays, as illustrated in FIG. 12. The windows 30, 31, and 32 of the zeroth order lobe are shown in FIG. 12 and provide three independent viewing windows corresponding to imaging of the original red, green, and blue channels, respectively. In particular, where such an LCD is used with a parallax element such as a lenticular screen with each lenticule being associated with three columns of pixels, the conventional active matrix addressing is such that the monochrome pixels of the first, second and third columns under each lenticule correspond to the red, green and blue pixels of the conventional delta panel. The RGB pixels of the conventional delta panel form respective data channels so that, by directing the first, second and third view image data to the red, green and blue channels, respectively, a three window monochrome display is provided.

Figure 13:
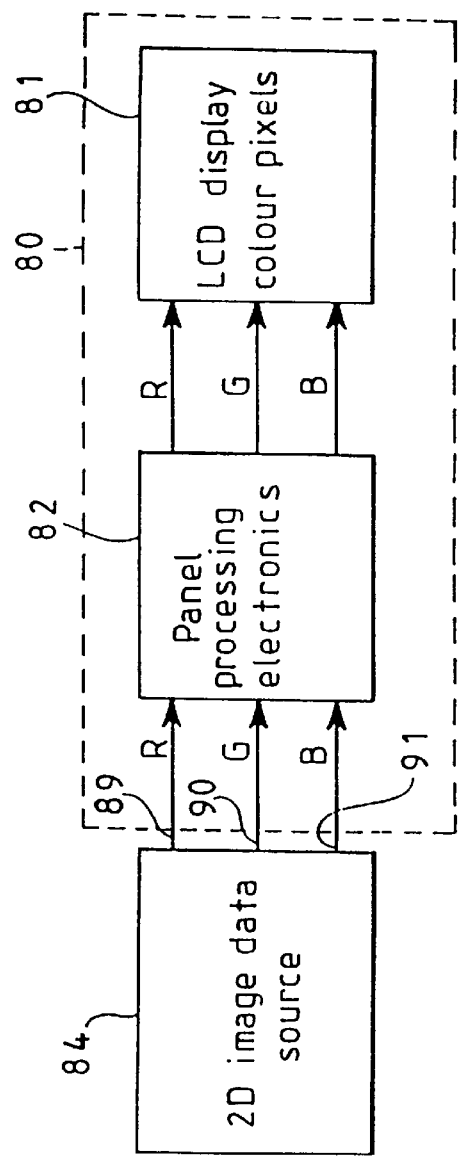
FIG. 13 is a block circuit diagram illustrating data flow for conventional use of an LCD delta panel.

Such an arrangement is shown in FIG. 13, which illustrates at 80 the general arrangement of a conventional RGB colour panel comprising LCD display colour pixels 81 driven by suitable panel processing electronics 82. The red, green and blue pixels are addressed by separate red, green and blue channels and receive two-dimensional image data at respective inputs connected to an image data source 84. Such arrangements are conventional so as to interface readily with sources of the type shown at 84 providing separate red, green and blue image data at respective outputs.

Figure 14:
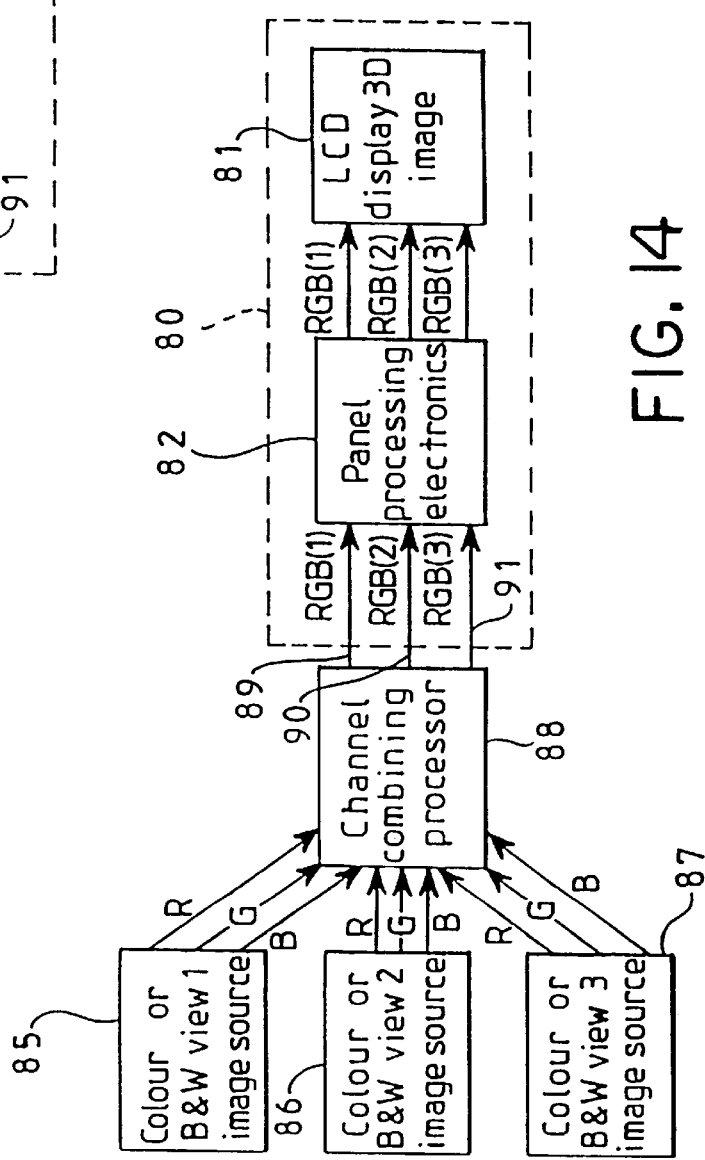
FIGS. 14 to 16 are block circuit diagrams illustrating data flow for an LCD delta panel displaying three, two and four view autostereoscopic images, respectively.

FIG. 14 illustrates a modified arrangement for driving the same delta panel 80 but with the colour filters 62 omitted for a monochrome display or modified as described hereinafter for a colour display. The display part 81 and the processing electronics 82 require little or no modification. Small modifications to the driving electronics may be required to deal with the way colour data are handled.

Three sources 85, 86 and 87 provide colour or black and white image data for views 1, 2 and 3 for forming an autostereoscopic three dimensional image. Each of the sources 85, 86 and 87 supplies RGB outputs to a channel combining processor 88. The processor 88 rearranges the image data so as to supply RGB data for view 1 to the red input of the panel 80. Similarly, RGB image data for the second and third views are supplied to the green and blue inputs 90 and 91, respectively, of the panel 80.

Thus, three spatially multiplexed views can be displayed by supplying their pixels to the original red, green, and blue channels of the LCD so that little or no modification of the electronic drive system of the LCD is required. The plus and minus first order lobes 33 and 34 are again present so that this type of LCD may be used in observer tracking displays without moving parts, for instance of the types disclosed in GB 9426334.0 (EP 95309516.3) and GB 9502555.7 (EP 96300552.5).

The displays described hereinbefore are of the three window type which supply images in three viewing windows. However, displays providing other numbers of windows, such as two and four window displays, may also be provided. For two and four window displays, additional driving electronics are required because the view information cannot necessarily be supplied down the original RGB channels.

Figure 15:
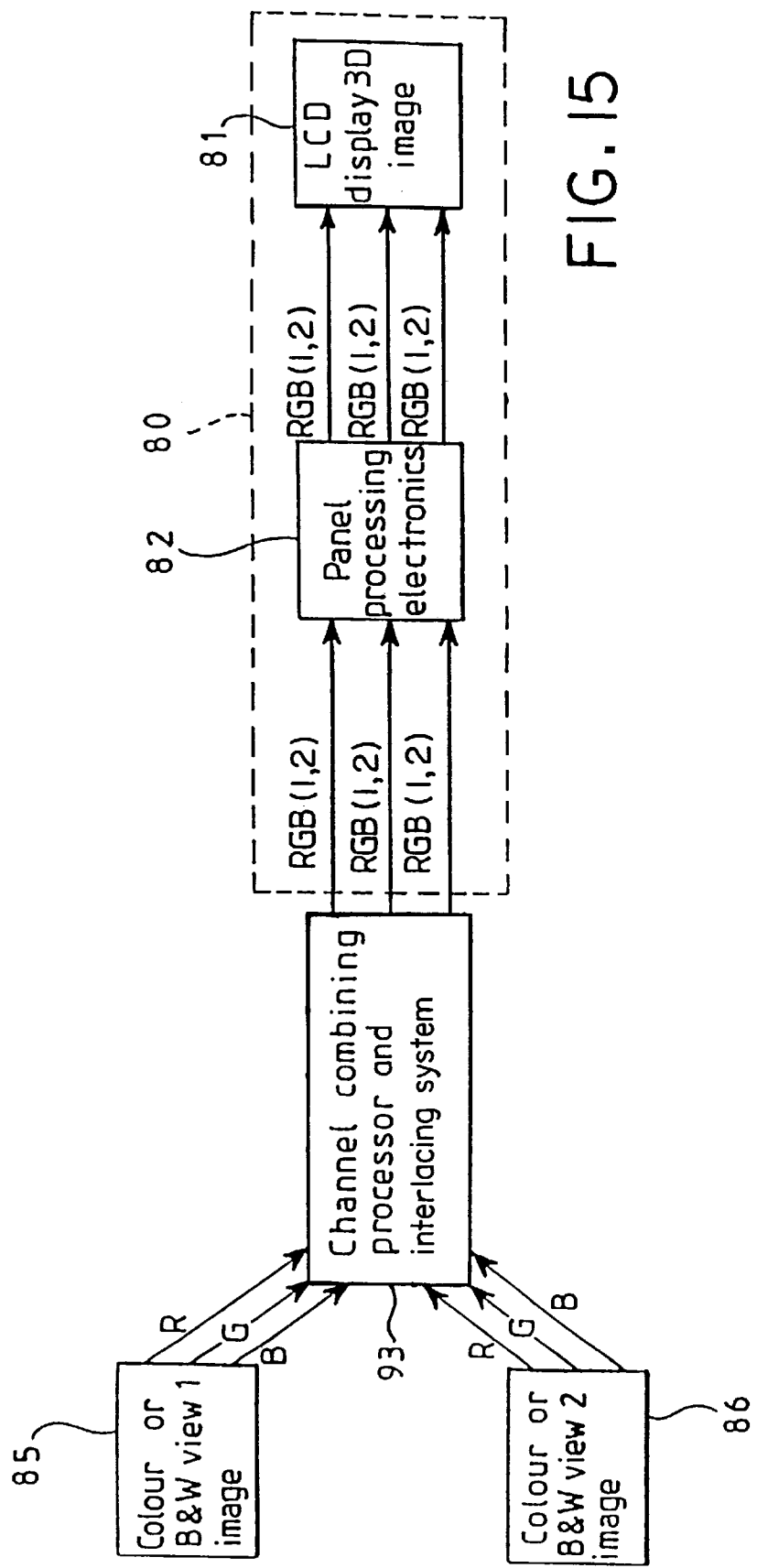

FIG. 15 illustrates an arrangement for driving a delta panel 80 with the colour filters omitted for a monochrome display or modified as described hereinafter for a colour display. The arrangement of FIG. 15 differs from that of FIG. 14 in that the source 87 is omitted so as to provide a two window display. Further, the channel combining processor 88 is replaced by a channel combining processor and interlacing system 93 which converts the image data from the sources 85 and 86 into a form suitable for display by the panel 80.

Figure 16:
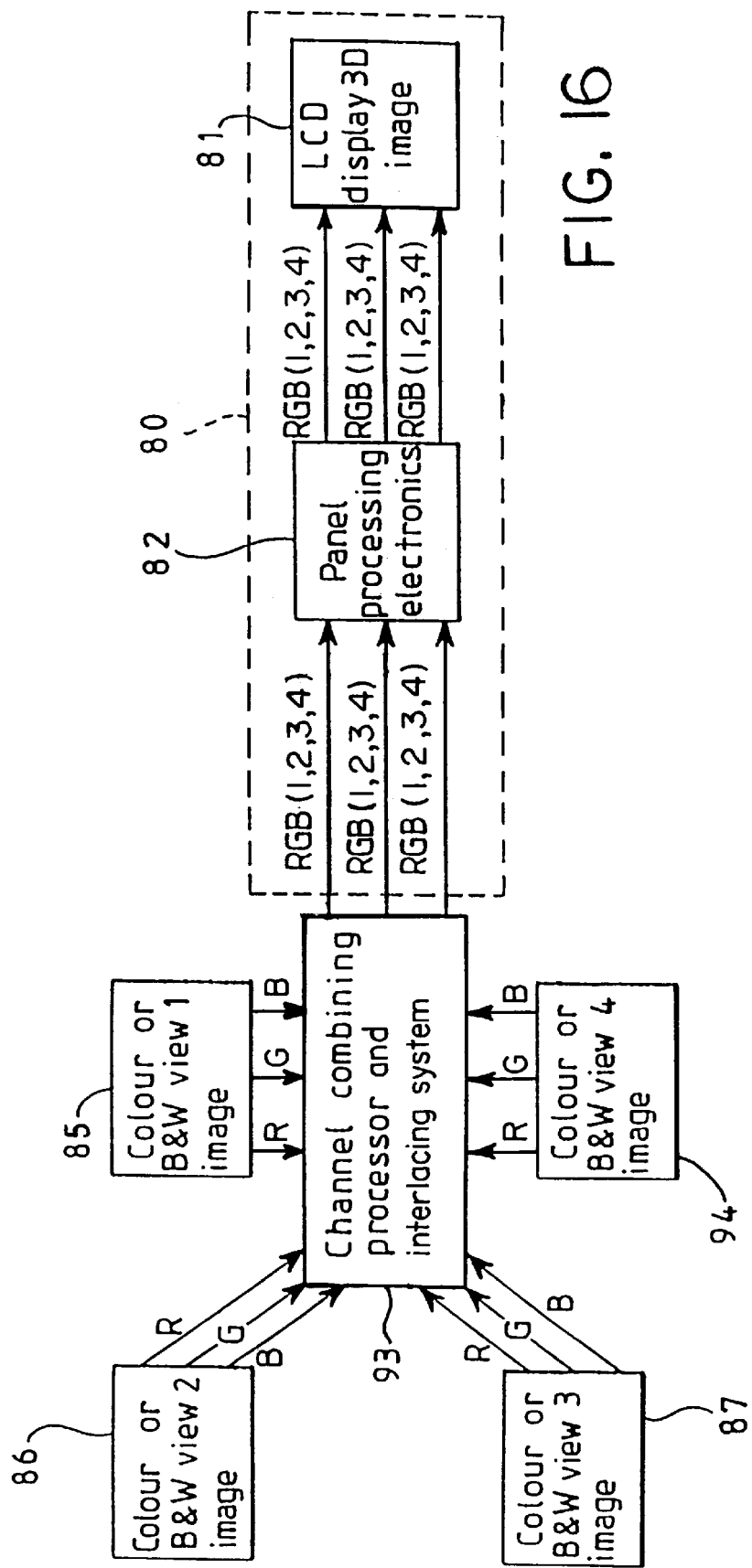

The arrangement shown in FIG. 16 differs from that shown in FIG. 15 in that the source 87 and a further source 94 are provided so as to provide a four window display. The channel combining processor and interlacing system 93 combines the image data from the sources into a form suitable for display by the panel 80 to provide a four window display.

The arrangements of FIGS. 14 to 16 can also be arranged to accept non-interlaced video signals from computer sources, for example.

An advantage of a two window display is that the display resolution is increased. However, such a display is not suitable for electronic tracking methods and may suffer from pseudoscopic image zones. An advantage of a four window display is that the quality of electronic tracking schemes is improved. However, such a display has reduced display resolution.

Figure 17:
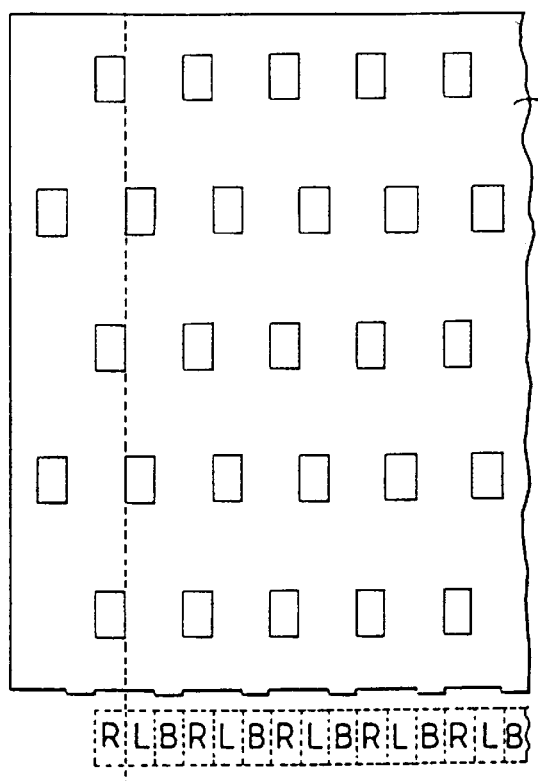
FIG. 17 illustrates another modified black mask pattern for making a LCSLM in accordance with a method constituting a second embodiment of the invention.

The black mask 2 illustrated in FIG. 10 is such that all of the columns of pixels are contiguous with the adjacent columns. This black mask may therefore be used to provide an autostereoscopic display having any desired number of contiguous views. For instance, where the LCD having the black mask of FIG. 10 is associated with a lenticular screen in which each lenticule is associated or aligned with N columns of pixels where N is an integer.greater than 1, the columns of each group will be contiguous because all of the columns are contiguous. Thus, the groups may be said to be contiguous with each other. FIG. 17 illustrates another modified pattern black mask 2 for use with a conventional delta display which differs from that shown in FIG. 10 in that the groups of columns are not contiguous. The black mask shown in FIG. 17 is illustrated for N=2 such that each group comprises two columns indicated as R and L at the bottom of FIG. 17 which are contiguous with each other. However, the groups are separated from each other by portions of the black mask forming vertical black columns indicated at the bottom of FIG. 17 by B.

Figure 18:
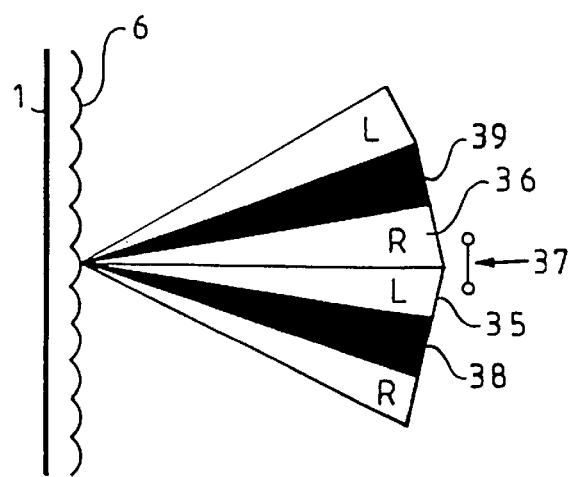
FIG. 18 shows the distribution of light from an autostereoscopic display with a LCSLM using the pattern of Figure 14.

The use of such an LCD 1 is illustrated in FIG. 18. The left and right views are visible in the windows 35 and 36 so that an observer whose eyes are positioned as illustrated at 37 perceives a three dimensional image. However, the windows 35 and 36 are isolated by dark regions 38 and 39 of sufficient width for the possibility of pseudoscopic viewing zones, in which the left eye sees the right view and the right eye sees the left view, to be effectively eliminated. The vertical black mask strips between pairs of contiguous columns of pixels are made sufficiently wide so that, when imaged by the lenticular screen, the dark regions 38 and 39 prevent the occurrence of pseudoscopic zones. Displays of the type illustrated in FIG. 18 are suitable for applications where observer tracking of the type described in European Patent Applications No's. 95309516.3 and 96300552.5 is not required. The use of a "black window" in such displays also results in reduced levels of cross-talk in such displays.

It is also possible to operate displays of the type producing three view windows as shown in FIG. 12 to prevent the occurrence of pseudoscopic zones. In such displays, if every third column of pixels is controlled to be black, then a fixed position display without pseudoscopic zones can be provided with light distribution as illustrated in FIG. 18. If the columns which are controlled to be "black", "left", and "right" are changed, for instance by a switch operated by an observer, then the nominal viewing position can be changed so that the observer can comfortably see the 3D image from a range of positions.

Figure 19:
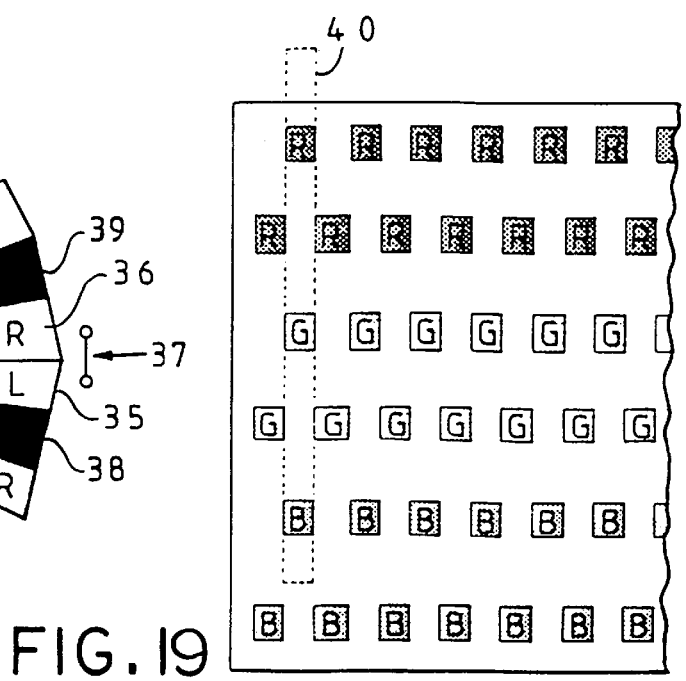

In order to provide a full colour display, colour filters having an arrangement different from the conventional delta arrangement are required. FIG. 19 illustrates a combination of a black mask pattern as shown in FIG. 10 and the provision of suitable colour filters. A colour filter having a repeating sequence of red, green, and blue horizontal stripes is arranged such that each stripe covers two rows of pixels. One group of RGB pixels forming a full colour pixel is illustrated at 40. Thus, both the black mask layer and the colour filter layer are modified from the standard delta arrangement LCD. The RGB signals for the required viewing windows are pre-processed before being supplied to the view channels, which may be the original RGB inputs as described hereinbefore. Alternatively, new display scanning electronics can be attached to the display.

With the pattern shown in FIG. 19, the colour pixel height is four times the vertical pixel pitch. This produces vertically extended colour pixels which may cause some separation of the colour components to an observer at a close viewing distance from the display, thus reducing the perceived image quality. FIG. 20 illustrates an alternative colour filter arrangement for reducing colour separation: Again, a striped colour filter is provided but the stripes run diagonally. With suitably modified addressing, other filter pattern arrangements are possible. The vertically extending rectangular boxes illustrate columns which are grouped together for imaging by a respective lenticule, for instance at the position illustrated at 41. The triangles show the groups of RGB pixels which form the colour pixels of the display. Thus, for each colour pixel, two of the RGB pixels are disposed vertically above each other and lie below one lenticule whereas the third RGB pixel is disposed in a vertically intermediate position and is located under the adjacent lenticule. Thus, the spatial separation of the RGB pixels is reduced in order to improve the vertical image quality.

Figure 23:
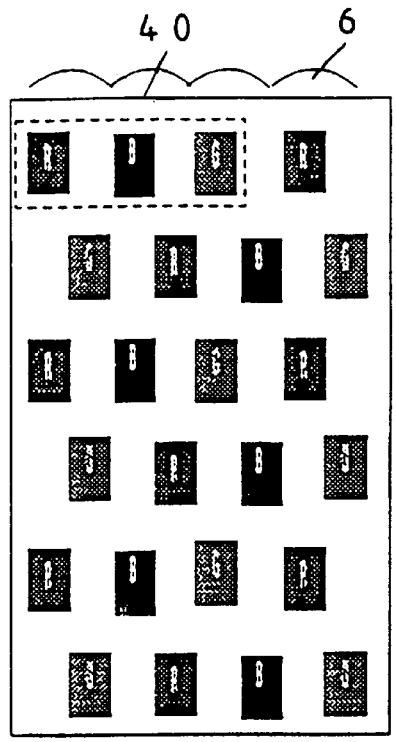
Figure 24:
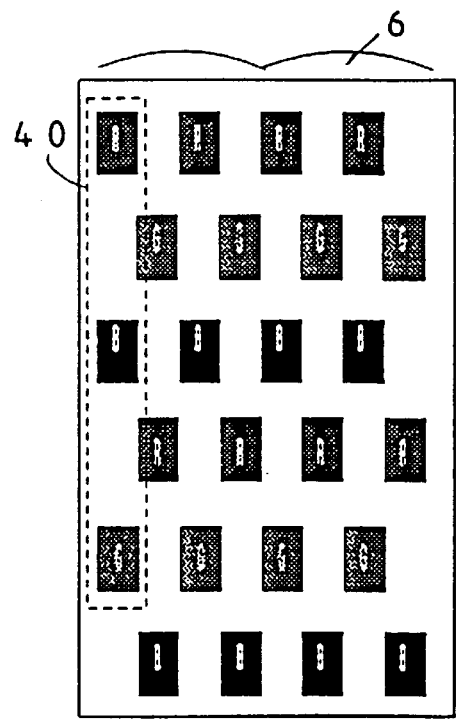
Figure 25:
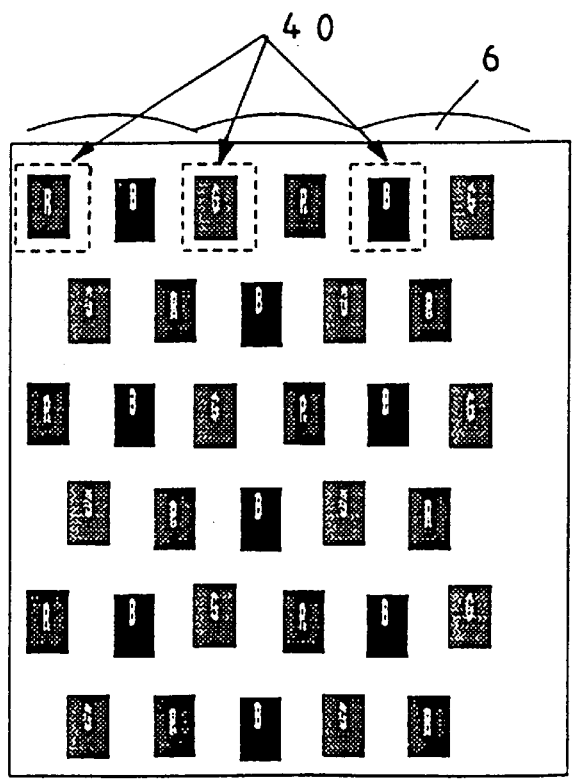

FIG. 21 shows a colour filter arrangement which differs from that shown in FIG. 19 in that each of the red, green, and blue horizontal stripes covers a single row of pixels. FIGS. 22 and 23 illustrate two colour filter arrangements which may be used for two window displays and FIGS. 24 and 25 show colour filter arrangements which may be used for four window displays. In each of these drawings, a typical colour pixel is indicated at 40.

Figure 26:
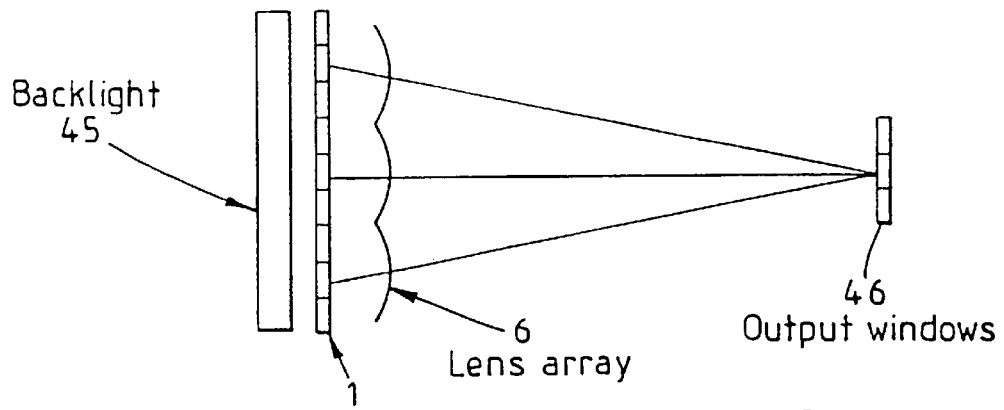
FIGS. 26 to 29 illustrate autostereoscopic displays using LCSLM's having black masks of the type shown in FIG. 10.

FIG. 26 shows an autostereoscopic display using an LCD 1 with a black mask as shown in FIG. 10 together with a lenticular screen 6. A backlight 45 is provided for illuminating the LCD and output windows 46 define an intended viewing position for an observer, for instance with the pitch of the windows being substantially equal to the average interlocular separation. The display is of the type providing three views simultaneously by spatial multiplexing.

Figure 27:
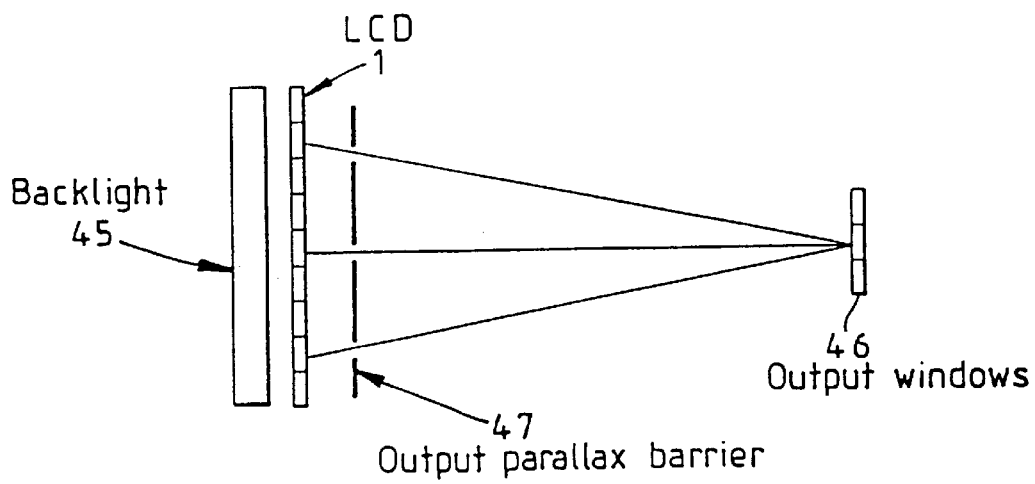

FIG. 27 differs from FIG. 26 in that the lenticular screen or other lens array 6 is replaced by an output parallax barrier 47. The parallax barrier comprises an opaque screen in which are formed parallel vertical slits which perform substantially the same imaging function as the lenticules of the lenticular screen 6. Parallax barriers do not suffer from some of the optical aberrations, which may occur in lenticular screens or other lens arrays, but suffer from greater diffraction effects and reduce the amount of light supplied to the observer compared with lens arrays.

Figure 28:
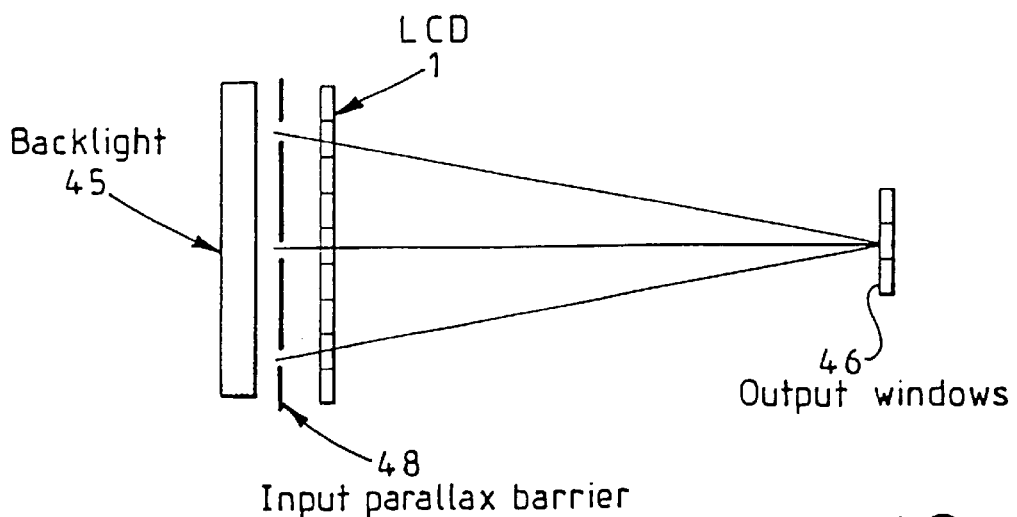

The autostereoscopic display shown in FIG. 28 differs from that of FIG. 27 in that the output parallax barrier 47 is replaced by an input parallax barrier 48 disposed between the backlight 45 and the LCD 1. This does not substantially affect operation of the display and, in particular, the formation of the output windows 46.

Figure 29:
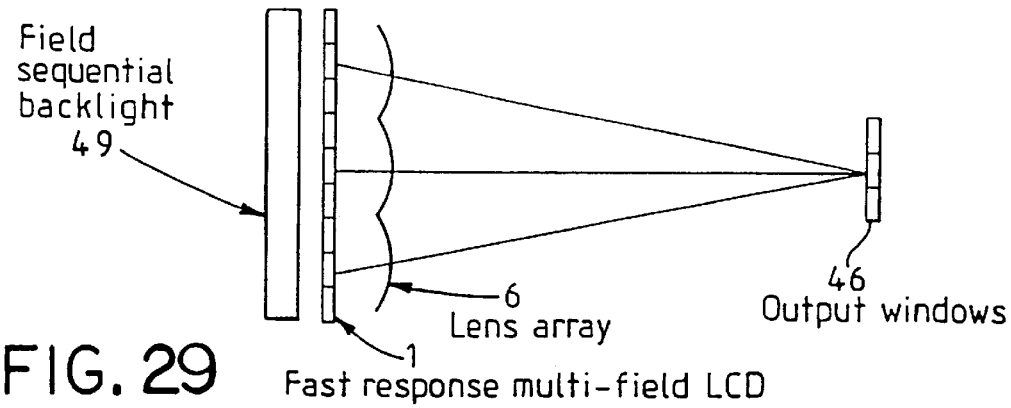

FIG. 29 illustrates an autostereoscopic display using a fast response multi-field monochrome LCD using a black mask of the type shown in FIG. 10 but omitting colour filtering. A field sequential backlight 49 is arranged to supply red, green, and blue light in a repeating sequence and may comprise fluorescent tubes having red, green and blue phosphors. Data from the red, green, and blue image planes are supplied to the LCD 1 in synchronism with the regions of red, green, and blue light provided by the backlight 49 so as to provide a full colour autostereoscopic display. Thus, the cost of providing colour filtering within the LCD 1 is eliminated but a fast response LCD capable of a refresh rate in excess of the standard video frame rate is generally required. Similarly, a suitable colour sequential/programmable backlight 49 is required.

Figure 30:
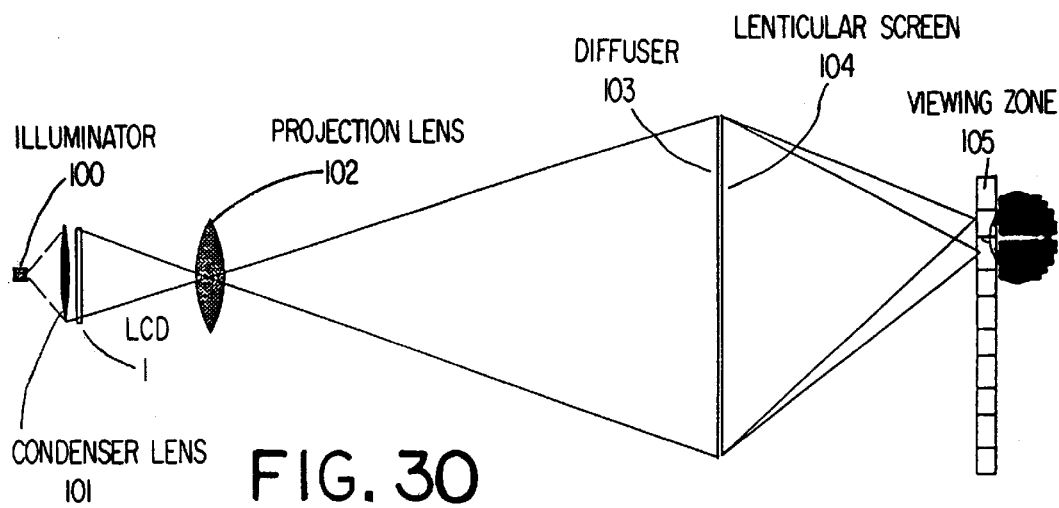
FIG. 30 illustrates a projection autostereoscopic display using an LCSLM having a black mask of the type shown in FIG. 10.

FIG. 30 illustrates a projection display using an LCD 1 of the type using the black mask 2 shown in FIG. 10. An illuminator 100 illuminates the LCD 1 via a condenser lens 101. A projections lens 102 projects images of the pixels onto a diffuser 103 associated with a lenticular screen 104. The projection lens 102 is arranged to image groups of columns of pixels onto the diffuser 103 in alignment with respective lenticules of the screen 104, which forms viewing zones 105. It is thus possible to provide a larger autostereoscopic 3D display than is normally possible with direct view displays.

LCD's 1 using black masks of the type shown in FIGS. 10 may also be used in a non-display mode in combination with a backlight effectively to provide a movable light source. Such arrangements are shown in FIGS. 31 to 33.

Figure 31:
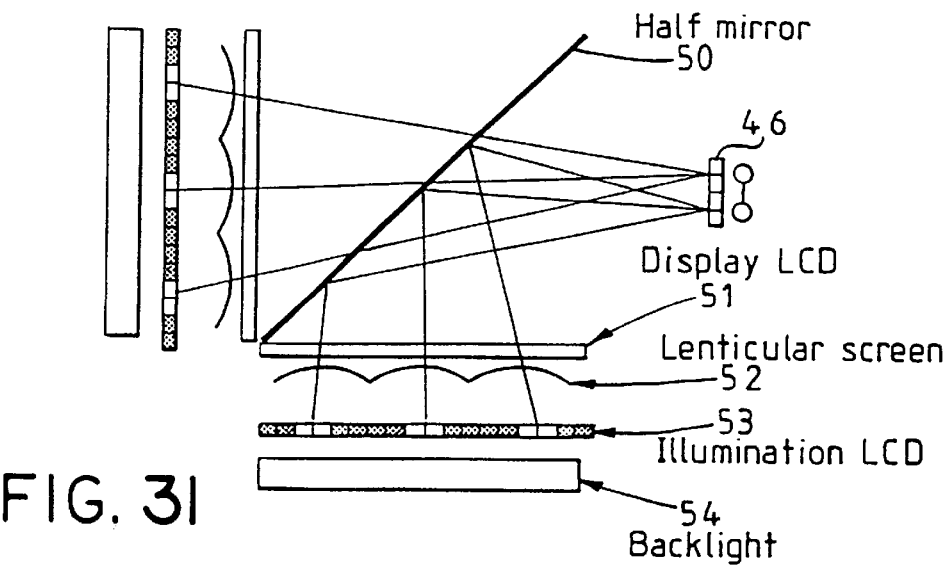

FIG. 31 shows a display of the type disclosed in EP 0602934 and EP 0 708 351. A beam combiner 50, for instance in the form of a partially silvered mirror, combines two pairs of views from two identical displays by transmitting light from one of the displays and reflecting light from the other display. Each display comprises a display LCD 51, a lenticular screen 52, an illumination LCD 53, and a backlight 54. The illumination LCD 53 is of the type having a black mask as shown in FIG. 9 or FIG. 14. By "moving" the illuminated pixel columns of the illumination LCD 53 in accordance with the position of an observer as detected by a suitable observer position detecting system, the display output windows 46 can be made to track the position of one or more observers so as to extend the viewing region in which the three dimensional image is perceptible.

FIG. 32 shows a temporally multiplexed type of display comprising a display LCD 51 which has a refresh rate sufficient to show the left and right views at twice the frame rate of the display. The illumination LCD 53 is synchronised with the display LCD 51 such that, when the left eye view is being displayed, the active pixel columns of the LCD 53 are imaged at the left eye position whereas, when the LCD 51 displays the right eye view, the active columns of the illumination LCD 53 are imaged at the right eye position of the observer at the output windows 46. By altering the positions of the active pixel columns of the illumination LCD 53 in accordance with the observer position, the output windows 46 can be made to track the observer so as to extend the region in which the three dimensional image is perceptible.

FIG. 33 shows an autostereoscopic display of the "micropolariser" type as disclosed in EP 95309180.8. The backlight 54 cooperates with an input polariser 55 and an LCD 56 having a black mask of the type shown in FIG. 10 or FIG. 17. The LCD layer 56 does not have an output polariser and thus forms vertical transparent strips arranged in pairs with the output polarisation of the strips of each pair being orthogonal. The output strips of the LCD 56 are imaged by a lenticular screen 6 through a micropolariser display device 57 which displays the two image views as interleaved vertical strips in a spatially multiplexed manner. The strips of each pair pass light of orthogonal polarisations so that the left and right views are imaged at the left and right output windows 46, respectively.

Figure 34:
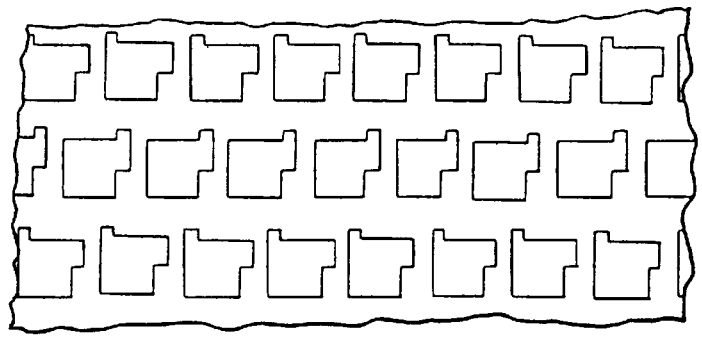
FIGS. 34 to 36 show other conventional delta pattern black masks of LCD's which may be modified using black mask patterns of the type shown in FIG. 10 or 17.
Figure 35:
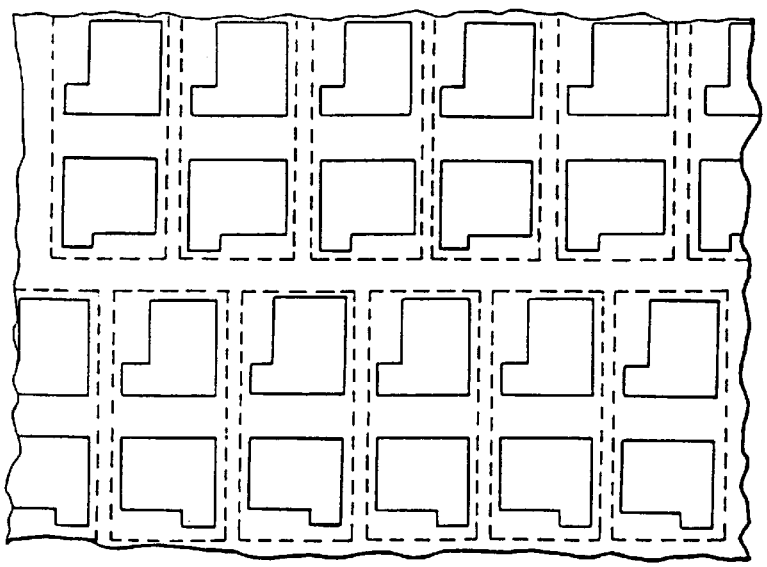
Figure 36:
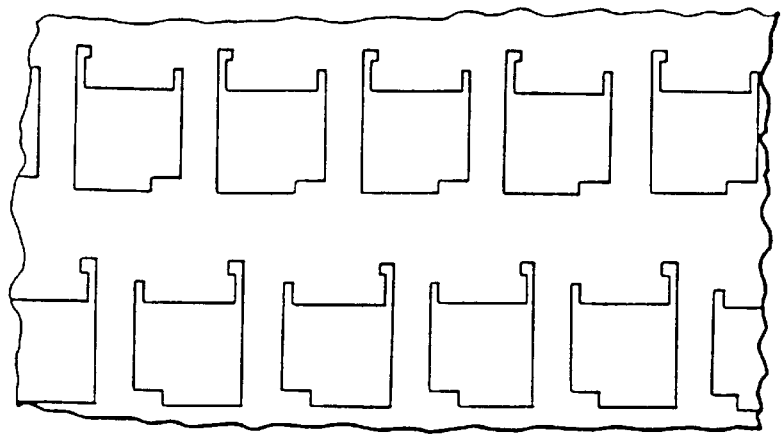

FIGS. 34 to 36 illustrate some conventional black masks for delta arrangement LCD's. By substituting black masks of the type shown in FIGS. 10 and 17, such conventional displays may be made suitable for use in autostereoscopic displays as described hereinbefore.

What is claimed is:

1. A method of making an active matrix liquid crystal spatial light modulator, comprising:

forming on a first substrate an array of addressing electrodes defining an array of liquid crystal pixels in which at least some of the pixels overlap in a predetermined direction;

forming on at least one of the first substrate and a second substrate an opaque mask defining pixel openings which are arranged to be optically aligned with respective ones of the pixels and which are arranged as groups of N adjacent columns of pixel openings, where N is an integer greater than one, such that the columns extend substantially perpendicularly to the predetermined direction and such that the columns of each group are substantially contiguous.

2. The method of claim 1, wherein the array of pixels is ordered in a delta arrangement.

3. The method of claim 1, further including forming a filter comprising color stripes extending substantially perpendicularly to the columns.

4. The method of claim 3, wherein each of the color stripes is aligned with a row of pixels.

5. The method of claim 3, wherein each of the color stripes is aligned with two adjacent rows of pixels.

6. The method of claim 3, wherein the filter comprises repeating sets of red, green, and blue color stripes.

7. The method of claim 1, further including forming a filter comprising color stripes extending diagonally with respect to the columns, each of the color stripes being aligned with a line of pixels.

8. The method of claim 6, wherein the filter comprises repeating sets of red, green, and blue color stripes.

9. The method of claim 1, wherein the pixel openings are of substantially constant and equal height in all axes substantially perpendicular to the predetermined direction.

10. A liquid crystal spatial light modulator made by the method of claim 1.

11. An autostereoscopic display comprising the spatial light modulator of claim 10 and a parallax screen.

12. The display of claim 11, wherein the parallax screen comprises a lenticular screen, wherein each lenticule of the lenticular screen is aligned with a respective group of columns.

13. The display of claim 11, wherein the parallax screen comprises a parallax barrier, wherein each slit of the parallax barrier is aligned with a respective group of columns.

14. The display of claim 11, wherein the spatial light modulator has a plurality of color inputs connected to a processing circuit for supplying each of the color inputs with image data of a respective view.

15. A backlight for an autostereoscopic display comprising the spatial light modulator of claim 10 and an extended light source.

16. An autostereoscopic display comprising the backlight of claim 15.

* * * * *